US011121751B2

(12) United States Patent
Raghavan et al.

(10) Patent No.: US 11,121,751 B2
(45) Date of Patent: Sep. 14, 2021

(54) TECHNIQUES FOR MULTILAYER BEAMFORMING IN WIRELESS COMMUNICATIONS

(71) Applicant: QUALCOMM Incorporated, San Diego, CA (US)

(72) Inventors: Vasanthan Raghavan, West Windsor Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/180,851

(22) Filed: Nov. 5, 2018

(65) Prior Publication Data

US 2020/0145070 A1    May 7, 2020

(51) Int. Cl.
    *H04B 7/06* (2006.01)
    *H04W 16/28* (2009.01)
    *H04W 24/02* (2009.01)
    *H04W 24/10* (2009.01)

(52) U.S. Cl.
    CPC .......... *H04B 7/0617* (2013.01); *H04W 16/28* (2013.01); *H04W 24/02* (2013.01); *H04W 24/10* (2013.01)

(58) Field of Classification Search
    None
    See application file for complete search history.

(56) References Cited

U.S. PATENT DOCUMENTS

| 2015/0282122 | A1  | 10/2015 | Kim |
| 2017/0041051 | A1* | 2/2017  | Rahman ............... H04B 7/0482 |
| 2018/0323845 | A1* | 11/2018 | Chang ................. H04L 25/0204 |
| 2019/0182093 | A1* | 6/2019  | Jayawardene ....... H04B 7/0888 |
| 2019/0245595 | A1* | 8/2019  | Xu ........................... H04B 7/04 |
| 2019/0246340 | A1* | 8/2019  | Jung ..................... H04W 48/16 |
| 2019/0260434 | A1* | 8/2019  | Park .......................... H04L 5/00 |
| 2020/0059290 | A1* | 2/2020  | Pan ..................... H04B 7/0695 |

FOREIGN PATENT DOCUMENTS

WO        2018085601 A1    5/2018

OTHER PUBLICATIONS

International Search Report and Written Opinion—PCT/US2019/059470—ISA/EPO—dated Mar. 11, 2020.
Partial International Search Report—PCT/US2019/059470—ISA/EPO—dated Jan. 22, 2020.

(Continued)

*Primary Examiner* — Saad Khawar
(74) *Attorney, Agent, or Firm* — Arent Fox, LLP

(57) ABSTRACT

Aspects described herein relate to determining multiple waveforms for transmitting wireless communications. A control waveform can be determined for transmitting a control information transmission related to a data transmission as one of multiple waveforms. A data waveform can be determined for transmitting the data transmission as one of the multiple waveforms. The control information transmission can be transmitted based on the control waveform, and the data transmission can be transmitted based on the data waveform.

44 Claims, 7 Drawing Sheets

(56) References Cited

OTHER PUBLICATIONS

Zte, et al., "Discussion on DL Beam Management," 3GPP Draft, 3GPP TSG RAN WG1 Meeting #88bis, R1-1704398, Discussions on DL Beam Management, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017, Apr. 2, 2017 (Apr. 2, 2017). XP051242546, pp. 1-12, Retrieved from the Internet: URL: http://www.3gpp.org/ftp/Meetings_3GPP_SYNC/RAN1/Docs/ - -[retrieved on Apr. 2, 2017], tables 1, 2, figure 1.

* cited by examiner

TECHNIQUES FOR MULTILAYER BEAMFORMING IN WIRELESS COMMUNICATIONS

BACKGROUND

Aspects of the present disclosure relate generally to wireless communication systems, and more particularly, to performing beamforming over multiple layers.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In addition, 5G NR supports the use of millimeter wave (mmW) antenna systems where nodes of the network (e.g., gNodeBs, user equipment (UEs), etc.) can include arrays of antennas and/or multiple subarrays of antennas in multiple radio frequency integrated circuits (RFICs) or other modules. The nodes can beamform signal energy (e.g., for transmitting or receiving signals) towards other nodes to facilitate communicating therebetween. Beamforming in this regard can include, for example, applying energy or power to certain ones of the arrays, subarrays, and/or antennas within an array or subarray such that some antennas have more energy than others and can thus form a beam in one or more directions for transmitting and/or receiving signals.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes determining, by a user equipment (UE) having multiple antenna subarrays each capable of beamforming using multiple beams, multiple beam groups each including a subset of the multiple beams, determining, by the UE, a beam group ordering of the multiple beam groups, receiving, from an access point and based on beamforming one or more of the multiple antenna subarrays using the beam group ordering, multiple transmit beams, determining one of the multiple transmit beams having a highest received signal metric, and reporting, to the access point, a first indication of at least one of the multiple beam groups or the beam group ordering along with a second indication associated with the one of the multiple transmit beams and an associated signal metric of the one of the multiple transmit beams.

In another example, an apparatus for wireless communication is provided. The apparatus includes a transceiver for communicating in a wireless network via multiple antenna subarrays each capable of beamforming using multiple beams, a memory configured to store instructions, and one or more processors communicatively coupled with the transceiver and the memory. The one or more processors are configured to determine multiple beam groups each including a subset of the multiple beams, determine a beam group ordering of the multiple beam groups, receive, from an access point and based on beamforming one or more of the multiple antenna subarrays using the beam group ordering, multiple transmit beams, determine one of the multiple transmit beams having a highest received signal metric, and report, to the access point, a first indication of at least one of the multiple beam groups or the beam group ordering along with a second indication associated with the one of the multiple transmit beams and an associated signal metric of the one of the multiple transmit beams.

In a further examples, an apparatus for communicating in a wireless network is provided. The apparatus includes means for determining, for multiple antenna subarrays each capable of beamforming using multiple beams, multiple beam groups each including a subset of the multiple beams, means for determining a beam group ordering of the multiple beam groups, means for receiving, from an access point and based on beamforming one or more of the multiple antenna subarrays using the beam group ordering, multiple transmit beams, means for determining one of the multiple transmit beams having a highest received signal metric, and means for reporting, to the access point, a first indication of at least one of the multiple beam groups or the beam group ordering along with a second indication associated with the one of the multiple transmit beams and an associated signal metric of the one of the multiple transmit beams.

In another example, a computer-readable medium including code executable by one or more processors for communicating in a wireless network is provided. The code includes code for determining, for multiple antenna subarrays each capable of beamforming using multiple beams, multiple beam groups each including a subset of the multiple beams, code for determining a beam group ordering of the multiple beam groups, code for receiving, from an access point and based on beamforming one or more of the multiple antenna subarrays using the beam group ordering, multiple transmit beams, code for determining one of the multiple transmit beams having a highest received signal metric, and code for reporting, to the access point, a first indication of at least one of the multiple beam groups or the beam group ordering along with a second indication associated with the one of the multiple transmit beams and an associated signal metric of the one of the multiple transmit beams.

In yet another example, a method for wireless communication is provided. The method includes transmitting, by an access point and to a UE, multiple transmit beams using multiple beamforming configurations of multiple antennas, receiving, by the access point and from the UE having multiple antenna subarrays, a reporting including a first indication of at least one of multiple beam groups or a beam group ordering, along with a second indication associated with the one of the multiple transmit beams and an associated signal metric of the one of the multiple transmit beams, determining, based on the reporting, one or more parameters indicating one or more desired beam groups or beam group orderings, and transmitting, to at least one of the UE or another UE, the one or more parameters to assist in receiving transmit beams from the access point.

In another example, an apparatus for wireless communication is provided. The apparatus includes a transceiver for communicating in a wireless network via multiple antennas in one or more subarrays, a memory configured to store instructions, and one or more processors communicatively coupled with the transceiver and the memory. The one or more processors are configured to transmit, to a UE, multiple transmit beams using multiple beamforming configurations of multiple antennas, receive, from the UE having multiple antenna subarrays, a reporting including a first indication of at least one of multiple beam groups or a beam group ordering, along with a second indication associated with the one of the multiple transmit beams and an associated signal metric of the one of the multiple transmit beams, determine, based on the reporting, one or more parameters indicating one or more desired beam groups or beam group orderings, and transmit, to at least one of the UE or another UE, the one or more parameters to assist in receiving transmit beams.

In another example, an apparatus for communicating in a wireless network is provided. The apparatus includes means for transmitting, to a UE, multiple transmit beams using multiple beamforming configurations of multiple antennas, means for receiving, from the UE having multiple antenna subarrays, a reporting including a first indication of at least one of multiple beam groups or a beam group ordering, along with a second indication associated with the one of the multiple transmit beams and an associated signal metric of the one of the multiple transmit beams, means for determining, based on the reporting, one or more parameters indicating one or more desired beam groups or beam group orderings, and means for transmitting, to at least one of the UE or another UE, the one or more parameters to assist in receiving transmit beams.

In another example, a computer-readable medium including code executable by one or more processors for communicating in a wireless network is provided. The code includes code for transmitting, to a UE, multiple transmit beams using multiple beamforming configurations of multiple antennas, code for receiving, from the UE having multiple antenna subarrays, a reporting including a first 1indication of at least one of multiple beam groups or a beam group ordering, along with a second indication associated with the one of the multiple transmit beams and an associated signal metric of the one of the multiple transmit beams, code for determining, based on the reporting, one or more parameters indicating one or more desired beam groups or beam group orderings, and code for transmitting, to at least one of the UE or another UE, the one or more parameters to assist in receiving transmit beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
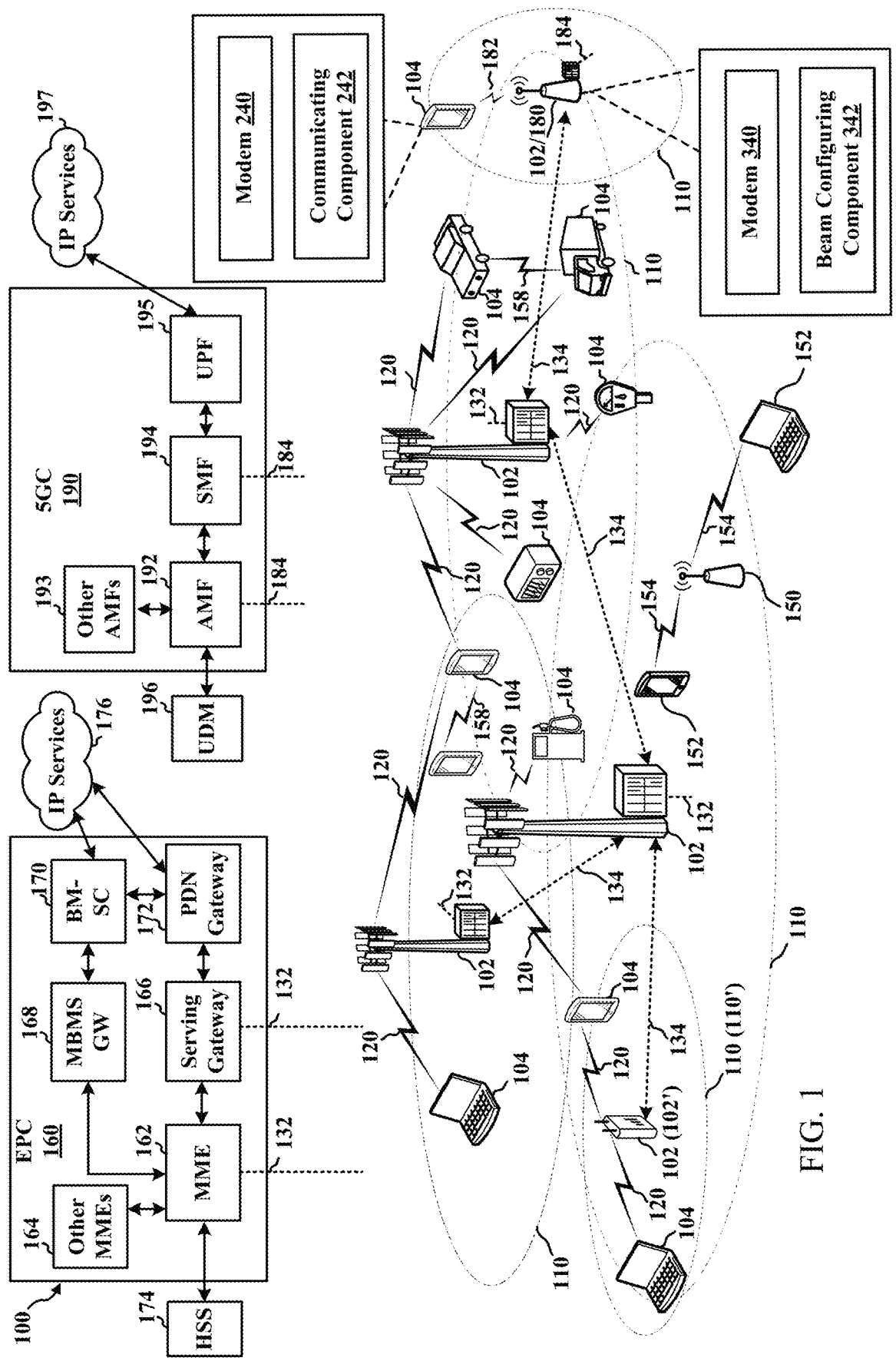
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to determining desirable beam groups for a first node in a wireless network to use in communicating with one or more other nodes in the wireless network. For example, the first node can include one or more antenna arrays (or subarrays) having a set of antennas that can beamformed for communicating in the wireless network. As described, beamforming can include applying different energy or power to antennas in an array (e.g., different portions of total available energy or power for the antenna array) to achieve a directional beam for transmitting and/or receiving communications. For example, this can be accomplished by applying different weights in computation of signal energy for providing to a given antenna, where the weights can be defined to achieve a given beam (e.g., as part of a beamforming matrix of weights to apply to multiple antennas in one or more subarrays).

In an example, the first node may be a user equipment (UE) equipped to communicate with the one or more other nodes, which may include gNodeBs (gNBs), other access points, intermediate nodes, other UEs, etc. The UE may include multiple antenna subarrays to enable modular design, increased diversity, better spherical coverage, etc. These design considerations are useful as the UE can have increased blocking considerations due to, for example, a user's hand or body as it holds the UE. Each antenna subarray in the UE may include multiple antennas (e.g., 2 to 8 antennas) and/or configurations of antennas, and each subarray can cover a distinct portion of a coverage "sphere" around the UE. Additionally, the UE can include multiple radio frequency (RF) chains (also generally referred to herein as "layers") that can be used to receive and/or transmit communications over one or more of the antenna subarrays. In this regard, the UE can form a beam for each RF chain using one or more of the antenna subarrays, and thus can form multiple beams given the multiple RF chains.

For example, given a UE's antenna structure, channel statistics and density/pattern/statistics of blockers (e.g., hand, humans, vehicles, buildings, foliage, etc.), there can be a desirable beam grouping over multiple RF chains and beam ordering over multiple time-instances to achieve a certain objective that may be independent of the instantaneous UE orientation/channel conditions. Such objectives may include, for example, increased opportunity for coverage, beam refinement opportunities, reduction in power consumption, etc., or a combination of these factors, etc. In addition, given this long-term dependence of the desirable beam grouping, the UE can try different beam groupings and orderings and report relevant findings/metrics to the gNB or another network node, which may include, for example, a cloud-based server. The findings/metrics can include an indication of a beam/subarray index at UE side, achieved signal metrics measured from a transmit bean received from the gNB, identification information for the transmit beam (e.g., a transmit beam index), etc. The gNB or other network node can collect these metrics, identifiers, etc. from multiple UEs and/or multiple UE types, and can use this information to determine, and inform UEs (of the same type) of, an a priori beam grouping and/or beam group ordering for a certain objective. The UE(s) can leverage this information along with any further instantaneous objective changes for synchronization signal (SS) beam training/refinement.

In this regard, at least a portion of the possible beams can be grouped for use over a time instant, and ordered for use over multiple time instances at the UE for multi-layer scanning of beams from a gNB. The gNB can also use a similar beamforming strategy given its multiple antennas and/or arrays of antennas. In one example, the UE can have two RF chains (also referred to herein as "layers"), and thus the beams can be paired. Though beam pairing may be referred to herein, beam grouping can be similarly applied to form more than two beams where more than two RF chains exist in the UE. In any case, the UE can determine the beam groups (also referred to herein as "beam grouping") and/or an ordering (also referred to herein as "beam group ordering") of the beam groups for beamforming to receive signals via multiple RF chains.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for generating beams for receiving communications, and some nodes may have a modem 340 and beam configuring component 342 for transmitting beamformed communications, as described herein. Though a UE 104 is shown as having the modem 240 and communicating component 242 and a base station 102/gNB 180 is shown as having the modem 340 and beam configuring component 342, this is one illustrative example, and substantially any node or type of node may include a modem 240 and communicating component 242 and/or a modem 340 and beam configuring component 342 for providing corresponding functionalities described herein. Moreover, though base station 102 is generally referred to herein, the aspects can similarly be applied to gNB 180 and/or substantially any node in a wireless network.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, a UE 104 can include multiple antenna subarrays and multiple RF chains, and communicating component 242 can determine beam groups associated with beamforming using certain beams that can be generated by one or more of the subarrays for each of the RF chains. The communicating component 242 can beamform the one or more subarrays according to the beam groups to receive transmit beams from a base station 102. As described further herein, the communicating component 242 can determine the beam group based on parameters received from the base station 102, based on a performance objective, as part of testing the beam groups (e.g., a beam training/refinement procedure) to determine a desirable beam group for communicating with the base station 102, etc. In addition, in this example, the base station 102 can include one or more antenna subarrays and can also beamform transmit beams for transmitting the UE 104 via beam configuring component 342. Beam configuring component 342 can receive beam measurements by the UE 104 for determining a desirable transmit beam for transmitting communications to the UE 104 and/or other UEs 104. The beam measurements received by the base station 102 may also include associated beam group information used to form receive beams at the UE 104. Beam configuring component 342 may accordingly use this information to determine not only the transmit beams, but also receive beams for the UE 104 and/or other UEs 104 to use in communicating with the base station 102. Beam configuring component 342 can communicate receive beam information to the UE 104 and/or other UEs, which can use this information (or may not use the information) to generate receive beams for receiving communications from the base station 102.

Figure 2:
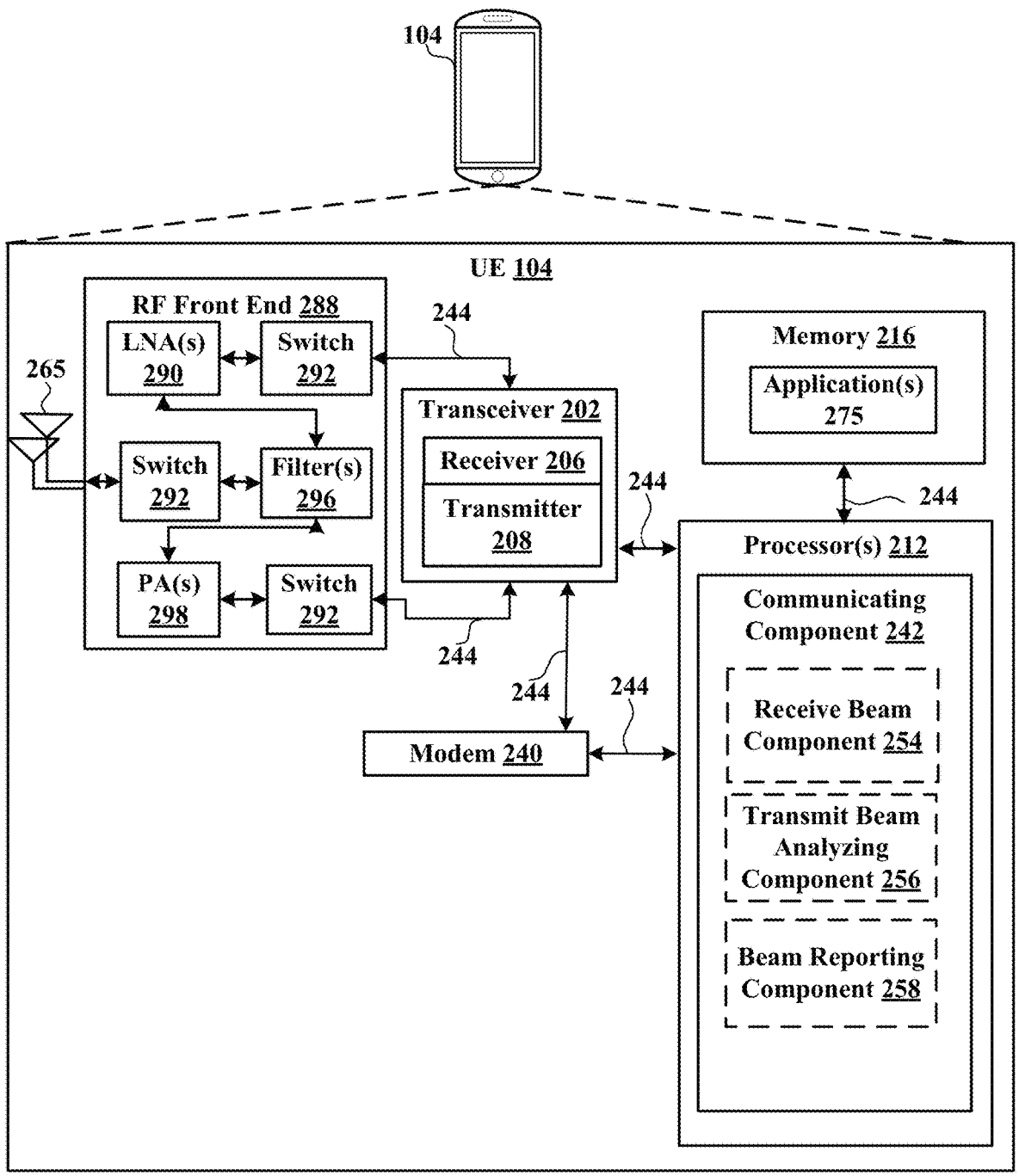
FIG. 2 is a block diagram illustrating an example of a UE, in accordance with various aspects of the present disclosure.
Figure 3:
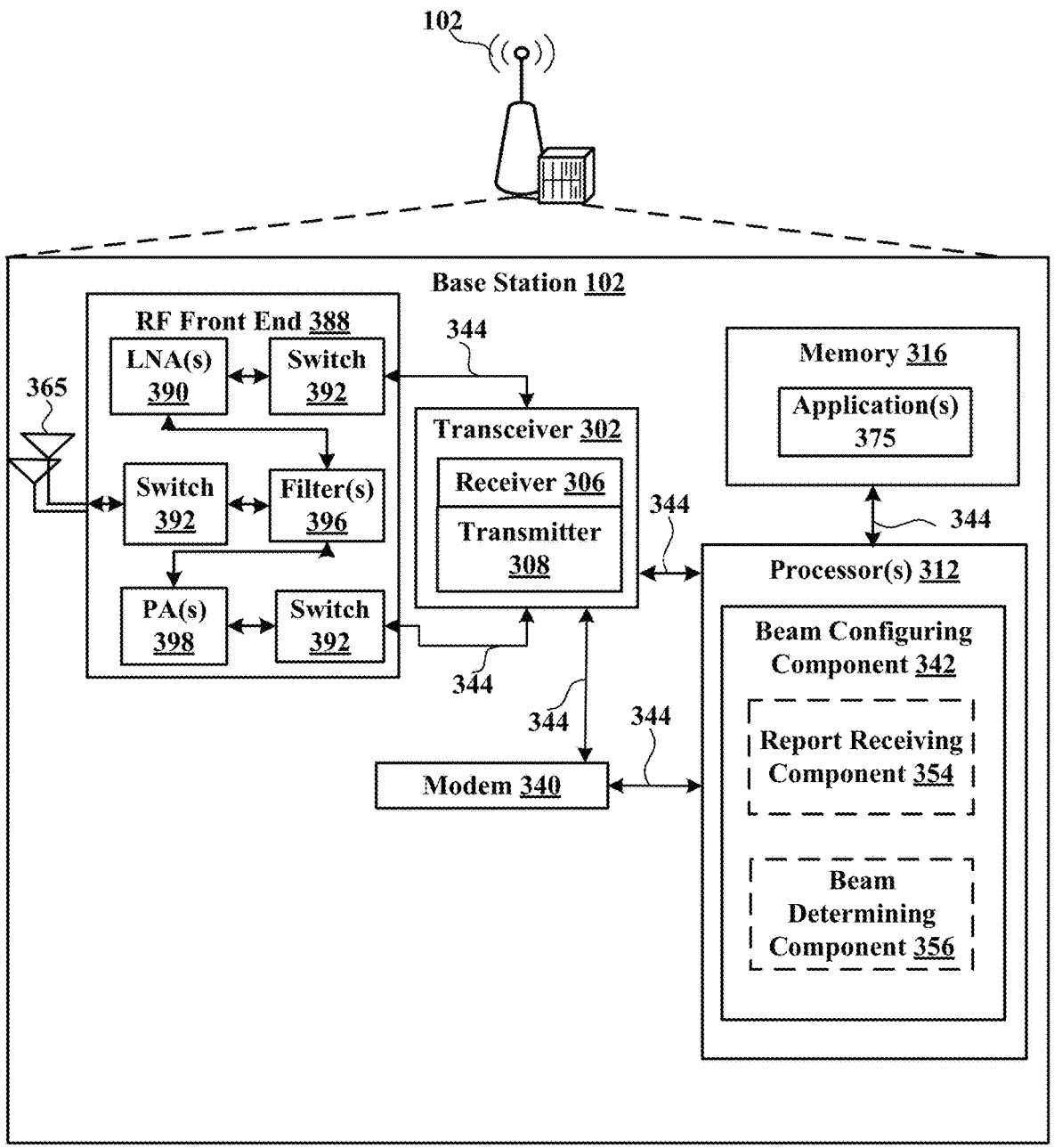
FIG. 3 is a block diagram illustrating an example of a base station, in accordance with various aspects of the present disclosure.
Figure 4:
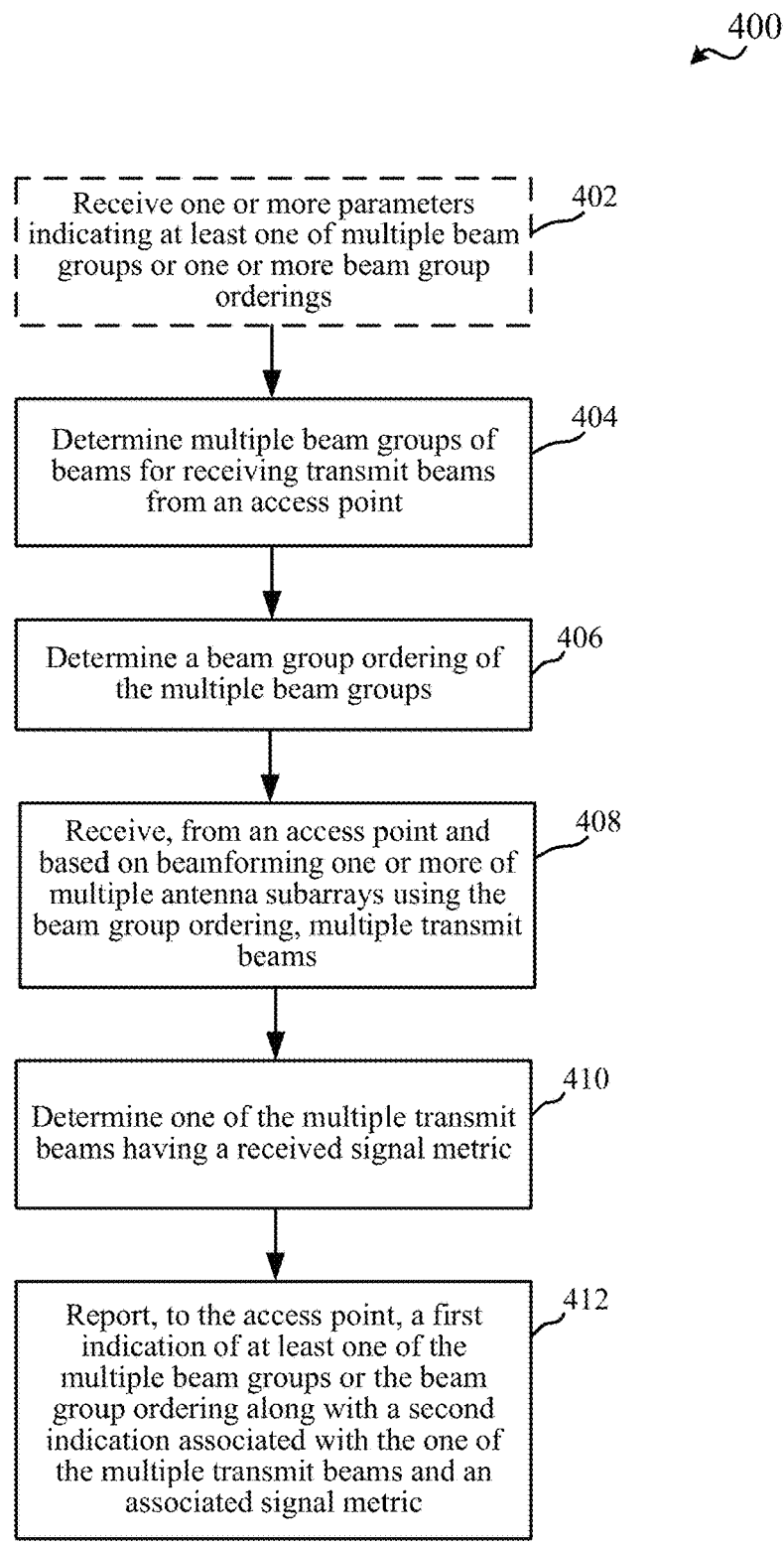
FIG. 4 is a flow chart illustrating an example of a method for reporting beam groups or beam group orderings used for receiving wireless communications, in accordance with various aspects of the present disclosure.
Figure 5:
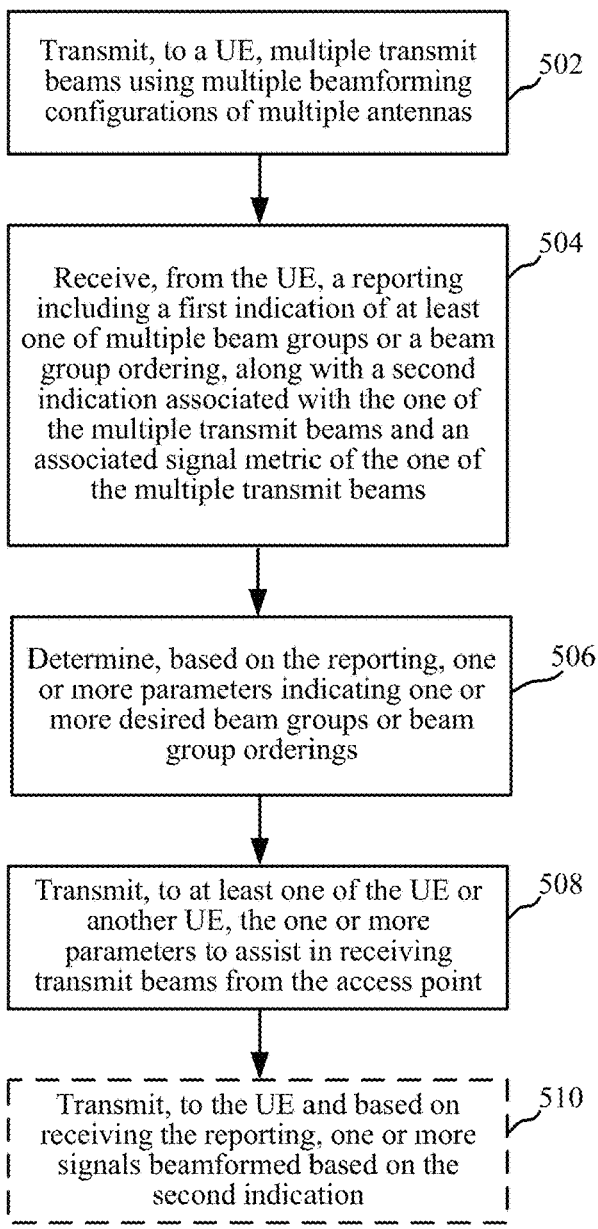
FIG. 5 is a flow chart illustrating an example of a method for configuring beam groups or beam group orderings used for receiving wireless communications, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 to enable one or more of the functions described herein related to beamforming multiple antennas in one or more antenna subarrays according to determined beam groups and/or according to a determined beam group ordering.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), reference signal received quality (RSRQ), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a receive beam component 254 for beamforming multiple antennas in one or more antenna subarrays of the UE 104 to receive communication from a different node (e.g., another UE, base station, etc.). For example, UE 104 can include multiple RF chains (e.g., including multiple instances of RF front ends 288 or related components, transceivers 202, modems 240, etc.). In this example, receive beam component 254 can beamform antennas of one or more subarrays for each RF chain to receive communications from the different node over each RF chain. In this regard, receive beam component 254 can group possible beams into groups of the number of RF chains (e.g., beam pairs for two RF chains). Communicating component 242 can also optionally include a transmit beam analyzing component 256 for receiving a transmit beam from the different nodes, and/or for determining one or more metrics regarding the transmit beam. Communicating component 242 can also optionally include a beam reporting component 258 for reporting information that may include one or more of beam group information used by the receive beam component 254 in beamforming, an identifier corresponding to the transmit beam, the one or more metrics determined for the transmit beam, etc.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and beam configuring component 342 for configuring beams at one or more UEs 104 for receiving beams transmitted by the base station 102/108.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

Moreover, as described with respect to the UE 104 above, the base station 102 may include one or more subarrays of multiple antennas and multiple RF chains, such that the base station 102 can transmit multiple beams over the multiple RF chains and using different beamforming configurations of the one or more antenna subarrays and/or of the antennas within the one or more sub arrays. In one specific non-limiting example, the base station 102 may include a smaller number of subarrays each having a larger number of antennas as compared to a UE. For example, the base station 102 may include an 8×8 or 8×16 planar array of antennas, whereas a UE may include a number of subarrays each having 2 to 8 antennas, as described further herein.

In an aspect, beam configuring component 342 can optionally include a report receiving component 354 for receiving a reporting from one or more UEs 104 indicating one or more of a transmit beam identifier of a transmit beam transmitted to the UE 104, a signal metric of the transmit beam, an indication of a beam group and/or beam group ordering used by the UE 104 to receive the transmit beam, and/or the like. Beam configuring component 342 can also optionally include a beam determining component 356 for determining one or more parameters for assisting one or more UEs in determining a beam to use in receiving communications from the base station 102.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for determining, by a first node, a beam group and/or beam group ordering for receiving communications from one or more other nodes in a wireless network. In an example, a UE 104 can perform the functions described in method 400 using one or more of the components described in FIGS. 1-2.

In method 400, optionally at Block 402, one or more parameters indicating at least one of multiple beam groups or one or more beam group orderings can be received. In an aspect, receive beam component 254, e.g., in conjunction with processor(s) 212, memory 216, transceiver 202, communicating component 242, etc., can receive the one or more parameters indicating the at least one of multiple beam groups or one or more beam group orderings. For example, the beam groups can relate to beam weights applied to the one or more antenna subarrays of the UE in a time instant, across multiple layers, to form a receive beam. The beam group ordering can relate to using beam groups over multiple time instants in a period of time. For example, receive beam component 254 can receive the one or more parameters from an access point, from a configuration stored in, or otherwise received by, the UE 104, etc., as described in further detail below. In one example, receive beam component 254 can use the beam groups and/or beam group orderings as a beam scanning order/pattern for regular synchronization signal (SS) beam training and/or refinement.

In method 400, at Block 404, multiple beam groups of beams for receiving transmit beams from an access point can be determined. In an aspect, receive beam component 254, e.g., in conjunction with processor(s) 212, memory 216, transceiver 202, communicating component 242, etc., can determine the multiple beam groups of beams for receiving the transmit beam from the access point (e.g., from base station 102, one or more other UEs in sidelink communications, etc.). As described, the UE 104 can include multiple antenna subarrays and can perform beamforming for antennas of one or more of the subarrays to determine receive beams for receiving signals from another node (e.g., an access point). In addition, the UE 104 can include multiple RF chains and receive beam component 254 can accordingly determine beam groups of beams (e.g., a subsets of the multiple possible beams) for each of the RF chains in a given time instant. In one example, receive beam component 254 can determine the multiple beam groups based on the one or more received parameters (e.g., in Block 402). In addition, for example, receive beam component 254 can determine the multiple beam groups based on one or more performance objectives, such as to maximize refinement opportunities for antenna subarrays, maximize coverage for the antenna subarrays, etc., as described herein.

In method 400, at Block 406, a beam group ordering of the multiple beam groups can be determined. In an aspect, receive beam component 254, e.g., in conjunction with processor(s) 212, memory 216, transceiver 202, communicating component 242, etc., can determine the beam group ordering of the multiple beam groups. For example, receive beam component 254 can determine the beam group ordering as an order for beamforming using the multiple beam groups over one or more periods of time, which may include determining a beam group of the multiple beam groups to use in multiple time instances in the one or more periods of time. In one example, receive beam component 254 can determine the beam group orderings based on the one or more received parameters (e.g., in Block 402). In addition, for example, receive beam component 254 can additionally or alternatively determine the multiple beam group orderings based on one or more performance objectives, such as to maximize refinement opportunities for antenna subarrays, maximize coverage for the antenna subarrays, etc., as described herein. In an example, the multiple beam groups and/or beam group orderings can be based on a configuration of antenna subarrays in the UE. Examples of antenna subarray configurations are shown in FIG. 6.

Figure 6:
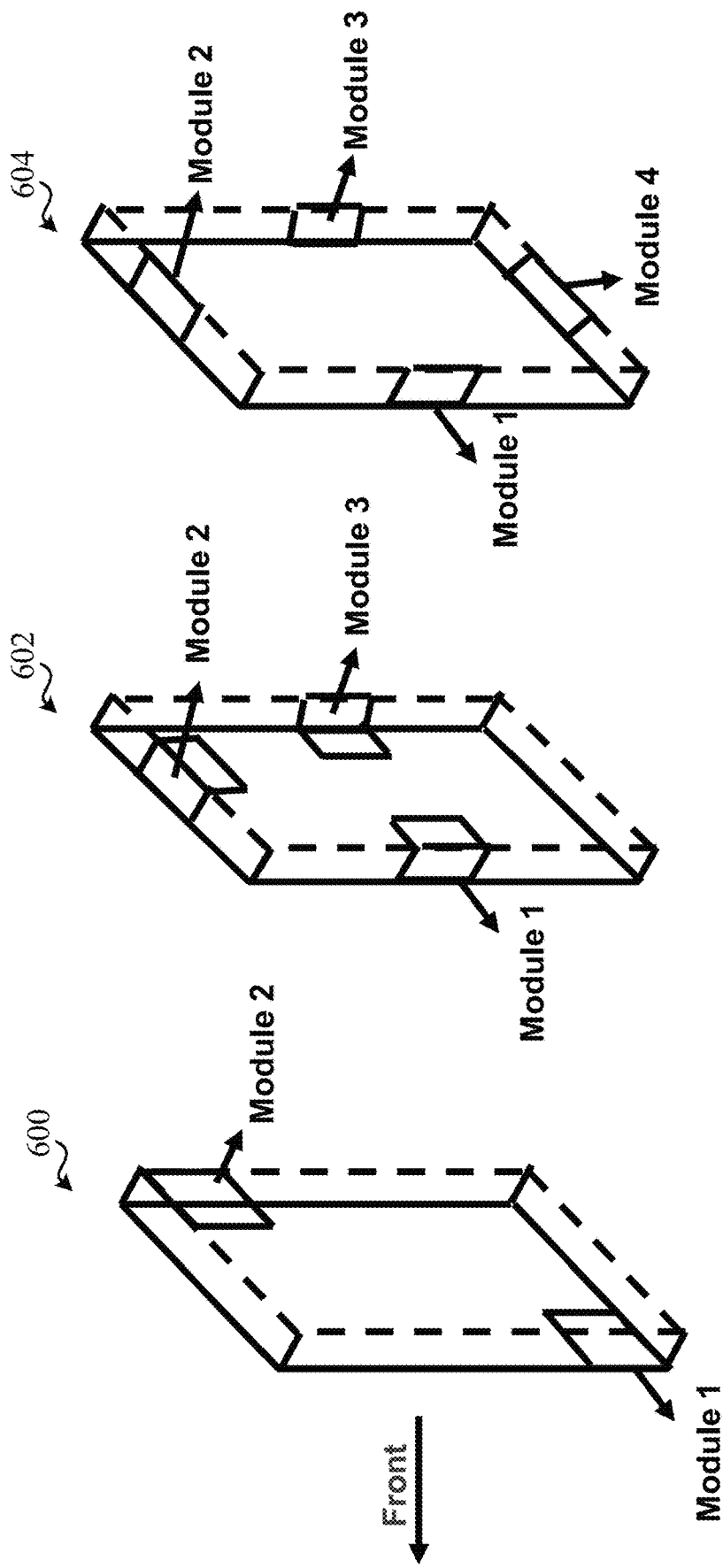
FIG. 6 illustrates examples of antenna subarray configurations in housings of devices, in accordance with various aspects of the present disclosure.

FIG. 6 illustrates various examples of antenna subarray configurations around a housing of a UE. UE housings 600, 602, 604 are shown as a three-dimensional box for housing components of a UE (e.g., components of UE 104 described in reference to FIG. 2), but may be of substantially any shape, size, etc. For example, UE housing 600 can include two RFIC modules positioned at opposing faces and/or opposing corners of the housing 600 (e.g., one RFIC module on the front and lower right corner and one RFIC module on the back and upper left corner). Each RFIC module can include one or more antenna subarrays. In another example, UE housing 602 can include three RFIC modules wrapped around corners of the housing as shown, and UE housing 604 can have four RFIC modules spaced around a perimeter of the housing 604 as shown. These are examples of using multiple RFIC modules in a UE, and substantially any configuration of multiple RFIC modules can be used to achieve desired wireless signal coverage.

Spacing the RFIC modules around the housing in these example configurations, and/or similar example configurations, can assist in providing wireless signal coverage in a "sphere" around the UE housings 600, 602, 604. Additionally, if one or more RFIC modules experience blockage (e.g., by a user placing a hand over the RFIC module(s)), the other RFIC module(s) may be exposed to provide more desirable wireless signal paths offering alternate coverage. In this regard, each RFIC module, and/or each antenna subarray within each RFIC module, can have different signal reception qualities. Accordingly, a UE can perform a beam scanning procedure for beam training and/or refinement, which can include determining which beam has desirable signal reception qualities for receiving signals from another node (e.g., an access point). In this example, the UE can beamform with multiple antennas in an antenna subarray (across multiple subarrays over different time instants) to determine which beams result in receiving the signals from the other node with desirable signal qualities. As the UE can be mobile and move around within or outside of a coverage area, the beams having desirable receive qualities can change, and thus beam scanning can be performed at least one of periodically, upon detecting an event relating to movement of the UE, etc. Moreover, as described further herein, where the UE has multiple RF chains, each including circuitry for processing received signal energy, as described above, the UE can perform beamforming using beam groups that are based on the subarrays in one or more RFIC modules, where each beam group can include a beam for each RF chain. In this regard, receive beam component 254 can determine beam groups for performing the beamforming of beams over the multiple layers as well as a beam ordering for the beam groups over a period of time.

For example, each RFIC module may include one or more dual-polarized subarrays (e.g., made of dual-polarized patch elements) or single-polarized subarrays (e.g., made of dipole elements of appropriate polarization). For example, an access point (e.g., base station 102) may transmit to the UE on two layers with polarization-based or non-polarization-based transmissions. For example, where the access point uses polarization-based transmissions, it can use a single directional beam with the same set of beam weights over both polarizations and/or may expect the UE to have dual-polarized subarrays used to double the achievable rate over single-polarized transmissions. For example, where the access point uses non-polarization-based transmissions, it can transmit two distinct beams (e.g., covering different spatial regions and thus corresponding to different sets of beam weights over the two layers) over the layer and/or may expect the UE to have single-polarized subarrays beamforming along different directions.

In one specific example, for the UE housing 600 having two RFIC modules, each RFIC module may include two dual-polarized subarrays (also referred to as a "patch"), each having four beams, and two single-polarized subarrays (also referred to as a "dipole"), each having two beams. In this example, the UE can have eight different subarrays and can possibly beamform 24 different beams to receive signals. In an example, the beams can be denoted as $B_i^j$ where i=1 to 2, or j=1 to 8 depending on the subarray represented, and where j represents an index of a subarray. For example, the subarrays can be indexed per RFIC module. Thus, for example, indices 1 to 4 can represent subarrays in one RFIC module and indices 5 to 8 can represent subarrays in the other RFIC module. In addition, indices 1, 2, 5, and 6 can represent the dual-polarized subarrays in associated RFIC modules, and indices 3, 4, 7, and 8 can present the single-polarized subarrays in the associated RFIC modules. Given this indexing scheme, in one example, the receive beam component 254 can determine 12 beam pairs, for use with two RF chains, by first forming dual-polarized beam pairs: $(B_i^1, B_i^2)$, $(B_i^5, B_i^6)$, for i=1, ..., 4. Then the single-polarized beams can be paired as well as there are two single-polarized subarrays in the RFIC modules: $(B_i^3, B_i^4)$, $(B_i^7, B_i^8)$, for i=1, 2.

This example beam grouping can be efficient on power consumption as it excites one RFIC module for a given beam pair. Note that the use of beam pairs across RFIC modules can be power expensive. It is possible to use other groupings of beams, and additional beams can be grouped within a given group where more RF chains are present. For example, selecting beam pairs across RFIC modules (e.g., such that a pair includes subarrays from separate RFIC modules) can increase power consumption, but can increase or maximize spatial coverage due to the spatially separated locations of the RFIC modules. In addition, where a UE has only dual-polarized subarrays within an RFIC module, the beams can be naturally paired for use with two RF chains. Where the UE has an even number of single-polarized subarrays within an RFIC module, the beams can be paired across pair partitions of subarrays. Where the UE has an odd number of single-polarized subarrays, the UE may beam pair across RFIC modules.

In one specific example, receive beam component 254 can detect available antenna types and/or other information and can determine beam groupings based on the following steps. For dual-polarized subarrays within an RFIC module, the number of antennas and number of beams may be the same for both polarizations, thus receive beam component 254 can pair the beams across the dual-polarized subarrays that point in the same or similar (set of) direction(s). This selection can allow for tuning to access point transmissions and may reduce power consumption. In addition, there can be a degree of freedom in maximizing refinement opportunities or coverage. If there are an even number of single-polarized subarrays within an RFIC module with the same number of antennas, the number of beams can be the same for each such pair. Thus, receive beam component 254 can then pair the beams across each pair of subarrays. This can simultaneously reduce power consumption and maximize coverage. If there are an odd number of single-polarized subarrays or single-polarized subarrays with a different number of antennas, receive beam component 254 may beam group across RFIC modules. In this example, for maximizing coverage and reducing power consumption, receive beam component 254 can pair the (possible) beams across all (possible and existing) pairs of subarrays within an RFIC module first in a first set. Then for the unpairable subarrays, receive beam component 254 can pair the (possible) beams within the subarray (for refinement and power considerations) or across RFIC modules (for coverage considerations) in a second set. For the spill-over beams from first or second set, receive beam component 254 can arbitrarily pair the (possible) beams.

In any case, based on the example beam grouping, the receive beam component 254 can, for example, determine a beam group ordering for scanning through the receive beam groups to determine a desirable receive beam group for receiving communications from the access point. For example, given the beam grouping defined in the specific example for two RFIC modules with the specific antenna configuration defined above, receive beam component 254 may determine the beam group ordering to maximize refinement opportunities with dual-polarized subarray patches and single-polarized subarray dipoles, as: $(B_1^1, B_1^2)$, $(B_2^1, B_2^2)$, $(B_3^1, B_3^2)$, $(B_4^1, B_4^2)$, $(B_1^3, B_1^4)$, $(B_2^3, B_2^4)$, $(B_1^7, B_1^8)$, $(B_2^7, B_2^8)$, $(B_1^5, B_1^6)$, $(B_2^5, B_2^6)$, $(B_3^5, B_3^6)$, $(B_4^5, B_4^6)$. In another example, receive beam component 254 may determine the beam group ordering to maximize coverage with dual-polarized subarray patches and single-polarized subarray dipoles, as: $(B_1^1, B_1^2)$, $(B_1^3, B_1^4)$, $(B_1^5, B_1^6)$, $(B_1^7, B_1^8)$, $(B_2^1, B_2^2)$, $(B_2^3, B_2^4)$, $(B_2^5, B_2^6)$, $(B_2^7, B_2^8)$, $(B_3^1, B_3^2)$, $(B_3^5, B_3^6)$, $(B_4^1, B_4^2)$ $(B_4^5, B_4^6)$.

In another specific example based on UE housing 602 having three RFIC modules, each RFIC module may include two dual-polarized subarrays with three beams and one single-polarized subarray with two beams. In this example, 24 beams are possible and can be denoted $B_i^j$, as explained above. In this example, receive beam component 254 can determine 12 beam pairs, for use with two RF chains, by first forming dual-polarized beam pairs: $(B_i^1, B_i^2)$, $(B_i^3, B_i^4)$, $(B_i^7, B_i^8)$, for i=1, 2, 3. Then the single-polarized beams can be paired within the RFIC modules: $(B_1^3, B_2^3)$, $(B_1^6, B_2^6)$, $(B_1^9, B_2^9)$ or across RFIC modules: $(B_1^3, B_1^6)$, $(B_2^6, B_2^9)$, $(B_2^3, B_1^9)$, or $(B_1^3, B_1^9)$, $(B_2^3, B_2^6)$, $(B_1^6, B_2^9)$. In one example, receive beam component 254 can determine the beam group ordering as $(B_1^1, B_1^2)$, $(B_1^4, B_1^5)$, $(B_1^7, B_1^8)$, $(B_1^3, B_1^6)$, $(B_2^1, B_2^2)$, $(B_2^4, B_2^5)$, $(B_2^7, B_2^8)$, $(B_2^6, B_2^9)$, $(B_3^1, B_3^2)$, $(B_3^4, B_3^5)$, $(B_3^7, B_3^8)$, $(B_2^3, B_1^9)$ to maximize coverage with patches and dipoles. In another example, receive beam component 254 can determine the beam group ordering as $(B_1^1, B_1^2)$, $(B_1^4, B_1^5)$, $(B_1^7, B_1^8)$, $(B_1^3, B_2^3)$, $(B_2^1, B_2^2)$, $(B_2^4, B_2^5)$, $(B_2^7, B_2^8)$, $(B_2^6, B_2^6)$, $(B_3^1, B_3^2)$, $(B_3^4, B_3^5)$, $(B_3^7, B_3^8)$, $(B_1^9, B_2^9)$ to maximize coverage with patches and to maximize refinement opportunities and/or reduce power consumption with dipoles. In another example, receive beam component 254 can determine the beam group ordering as $(B_1^1, B_1^2)$, $(B_2^1, B_2^2)$, $(B_3^1, B_3^2)$, $(B_3^1, B_1^6)$, $(B_1^4, B_1^5)$, $(B_2^4, B_2^5)$, $(B_3^4, B_3^5)$, $(B_2^6, B_2^9)$, $(B_1^7, B_1^8)$, $(B_2^7, B_2^8)$, $(B_3^7, B_3^8)$, $(B_2^3, B_1^9)$ to maximize refinement opportunities with patches and maximize coverage with dipoles. In another example, receive beam component 254 can determine the beam group ordering as $(B_1^1, B_1^2)$, $(B_2^1, B_2^2)$, $(B_3^1, B_3^2)$, $(B_1^3, B_2^3)$, $(B_1^4, B_1^5)$, $(B_2^4, B_2^5)$, $(B_3^4, B_3^5)$, $(B_2^6, B_2^6)$, $(B_1^7, B_1^8)$, $(B_2^7, B_2^8)$, $(B_3^7, B_3^8)$, $(B_1^9, B_2^9)$ to maximize refinement opportunities and/or reduce power consumption with patches and dipoles.

In another specific example based on UE housing 604 having four RFIC modules, each RFIC module may include two dual-polarized subarrays with three beams. In this example, 24 beams are possible and can be denoted $B_i^j$, as explained above. In this example, receive beam component 254 can determine 12 beam pairs, for use with two RF chains, by forming dual-polarized beam pairs: $(B_i^1, B_i^2)$, $(B_i^3, B_i^4)$, $(B_i^7, B_i^8)$, for i=1, 2, 3. In one example, receive beam component 254 can determine the beam group ordering as $(B_1^1, B_1^2)$, $(B_1^3, B_1^4)$, $(B_1^5, B_1^6)$, $(B_1^7, B_1^8)$, $(B_2^1, B_2^2)$, $(B_2^3, B_2^4)$, $(B_2^5, B_2^6)$, $(B_2^7, B_2^8)$, $(B_3^1, B_3^2)$, $(B_3^3, B_3^4)$, $(B_3^5, B_3^6)$, $(B_3^7, B_3^8)$ BD to maximize coverage, or $(B_1^1, B_1^2)$, $(B_2^1, B_2^2)$, $(B_3^1, B_3^2)$, $(B_1^3, B_1^4)$, $(B_2^3, B_2^4)$, $(B_3^3, B_3^4)$, $(B_1^5, B_1^6)$, $(B_2^5, B_2^6)$, $(B_3^5, B_3^6)$, $(B_1^7, B_1^8)$, $(B_2^7, B_2^8)$, $(B_3^7, B_3^8)$ to maximum refinement opportunities.

In an example, receive beam component 254 can determine which beam grouping and/or beam group ordering to use based on a configuration stored in, or received by, the UE 104. For example, the configuration may be stored in the UE 104 (e.g., in subscription information, hardcoded into memory, etc.) or may be received from the access point or other network entity, etc. In another example, receive beam component 254 can determine which beam grouping and/or beam group ordering to use based on determining one or more parameters, such as a signal quality metric of a received signal (e.g., RSRP, RSRQ, RSSI, SNR, etc.), and/or can determine different beam groupings and/or beam group orderings for different values of the one or more parameters. In one example, the possible beam groupings and beam group orderings can be configured in the UE 104 and access point such that the UE 104 and access point can refer to the beam groups using indices. For instance, in this example, the access point may configure the UE with beam groups or beam group orderings by using associated indices. In any case, receive beam component 254 can beamform the antenna subarrays based on the receive beams using the beam groups and associated beam group ordering over a period of time to determine which beam group(s) and/or beam group ordering are desirable for receiving transmit beams from an access point (e.g., determine which beam group results in receiving a transmit beam with the highest signal metric).

In method 400, at Block 408, multiple transmit beams can be received from an access point and based on beamforming one or more of multiple antenna subarrays using the beam group ordering. In an aspect, receive beam component 254, e.g., in conjunction with processor(s) 212, memory 216, transceiver 202, communicating component 242, etc., can receive, from the access point (e.g., base station 102) and based on beamforming one or more of multiple antenna subarrays using the beam group ordering, multiple transmit beams. For example, receive beam component 254 can receive the multiple transmit beams with the antenna subarray(s) beamformed based on a first beam group of the beam group ordering in first time instant, based on a second beam group of the beam group ordering in a second time instant, etc., according to the beam group ordering. In an example, the access point can also beamform transmit beams based on a beam group and/or beam group ordering to determine (e.g., based on feedback from the UE 104) desirable transmit beams for communicating with the UE 104 and/or other UEs.

In method 400, at Block 410, one of the multiple transmit beams having a received signal metric can be determined. In an aspect, transmit beam analyzing component 256, e.g., in conjunction with processor(s) 212, memory 216, transceiver 202, communicating component 242, etc., can determine the one of the multiple transmit beams having the received signal metric. For example, transmit beam analyzing component 256 can receive and measure one or more signal metrics of the multiple transmit beams, such as RSRP, RSRQ, RSSI, SNR, etc., and can determine one of the multiple transmit beams having a desirable signal metric. For example, transmit beam analyzing component 256 can determine one of the multiple transmit beams that has a highest signal metric of all the received transmit beams one of the multiple transmit beans that has a signal metric that is at least at a threshold level, etc.

In method 400, at Block 412, a first indication of at least one of the multiple beam groups or the beam group ordering can be reported to the access point along with a second indication associated with the one of the multiple transmit beams and an associated signal metric. In an aspect, beam reporting component 258, e.g., in conjunction with processor(s) 212, memory 216, transceiver 202, communicating component 242, etc., can report, to the access point (e.g., to base station 102), the first indication of at least one of the multiple beam groups or the beam group ordering along with the second indication associated with the one of the multiple transmit beams and the associated signal metric. For example, beam reporting component 258 can indicate the beam group and/or beam group ordering used to beamform the antenna subarray(s) to receive the transmit beams and the associated transmit beam metrics. Based on this information, for example and as further described herein, the access point can determine a desirable beam grouping and/or beam group ordering to be used by the UE 104 and/or other UEs in receiving transmit beams from the access point. For example, this can be the beam group and/or beam group ordering for which a highest signal metric is reported.

Moreover, for example, reporting the indications can occur over a period of time such that the beam reporting component 258 can report multiple indications of multiple beam groups and/or beam group orderings over the period of time. In this regard, the multiple reportings can assist in capturing long-term behavior of the channel statistics between the UE 104 and access point, blocker evolution and dynamics, etc. to provide the access point with additional information in determining the desirable beam group(s) and/or beam group ordering(s). Furthermore, reporting the indications can be part of a beam scanning procedure performed by the UE 104 to train and/or refine beams used for communicating with the access point.

Thus, in one example, receiving the one or more parameters at Block 402 can include receiving one or more parameters from the access point indicating the determined desirable beam group(s) and/or beam group ordering(s). As described, this may be an index or indices indicating the beam groups and/or beam group ordering. Moreover, this can include beam group(s) and/or beam group ordering(s) determined by the access point based on reportings from the UE 104 and/or from other UEs. Moreover, the access point may indicate, in the one or more parameters, various beam groups and/or beam group orderings for different performance objectives. In an example, receive beam component 254 can determine to use the received parameters to determine the beam groups and/or beam group ordering. In another example, receive beam component 254 can determine the beam groups and/or beam group ordering based on other considerations (e.g., additionally or alternatively to the one or more received parameters). For example, receive beam component 254 can determine the beam groups and/or beam group orderings to use such to maximize refinement opportunities, maximize coverage, minimize power consumption, etc., as described above, and/or based on a changing channel condition, a detected antenna blocking condition, etc. Moreover, in one example, the one or more parameters received from the access point may correspond to a type of the UE (or corresponding antenna structure/arrangement, etc.), as described herein, such that the access point provides parameters received from one type of UE to UEs of the same or similar type.

FIG. 5 illustrates a flow chart of an example of a method 500 for configuring a UE to receive communications using certain beam groups and/or beam group ordering. In an example, a base station 102 can perform the functions described in method 500 using one or more of the components described in FIGS. 1 and 3.

In method 500, at Block 502, multiple transmit beams can be transmitted to a UE using multiple beamforming configurations of multiple antennas. In an aspect, beam configuring component 342, e.g., in conjunction with processor(s) 312, memory 316, transceiver 302, etc., can transmit, to the UE (e.g., UE 104), the multiple transmit beams using multiple beamforming configurations of multiple antennas. For example, beam configuring component 342 can use different beam groups and/or beam group orderings to transmit beams to the UE 104, and can determine desirable beam groups and/or beam group orderings based on receiving feedback of signal metrics from the UE 104 and/or other UEs over a period of time. A base station 102, for example, may include one RFIC module and/or one antenna subarray with a larger number of antennas than the subarrays of the UE 104. In addition, the period of time over which to consider feedback for determining beam groups and/or orderings, as described herein, may be determined by the beam configuring component 342 based on a configuration, based on detecting occurrence of an event, based on a number of reports received from UEs, and/or the like.

In method 500, at Block 504, a reporting including a first indication of at least one of multiple beam groups or a beam group ordering can be received from the UE, along with a second indication associated with the one of the multiple transmit beams and an associated signal metric of the one of the multiple transmit beams. In an aspect, report receiving component 354, e.g., in conjunction with processor(s) 312, memory 316, transceiver 302, beam configuring component 342, etc., can receive, from the UE (e.g., UE 104), the reporting including the first indication of at least one of the multiple beam groups or the beam group ordering, along with the second indication associated with the one of the multiple transmit beams and the associated signal metric of the one of the multiple transmit beams. Thus, for example, report receiving component 354 can receive the report transmitted by the UE 104 (e.g., in Block 412 of FIG. 4). Moreover, as described, receiving the report may include receiving multiple reports from the UE 104 for different beam groups and/or beam group orderings over a period of time.

In method 500, at Block 506, one or more parameters indicating one or more desired beam groups or beam group orderings can be determined based on the reporting. In an aspect, beam determining component 356, e.g., in conjunction with processor(s) 312, memory 316, transceiver 302, beam configuring component 342, etc., can determine, based on the reporting, the one or more parameters indicating the one or more desired beam groups or beam group orderings. For example, beam determining component 356 can determine, over a period of time, reported beam groups and/or beam group orderings used by the UE 104 that resulted in measuring desirable signal metrics for a given transmit beam (e.g., a highest signal metric for the given transmit beam, a signal metric for the given transmit beam that is at least at a threshold level, etc.). In one example, beam determining component 356 can determine the desirable beam groups and/or beam group orderings for a given transmit beam transmitted by the base station 102 at a given time instant, which can be determined based on the reporting from UE 104 and/or other UEs over a previous period of time. Moreover, for example, beam determining component 356 can associate the parameters with a certain type of UE for providing the parameters to UEs of that type. In this example, beam determining component 356 may provide different beam group and/or beam group ordering information to different types of UEs.

In method 500, at Block 508, the one or more parameters can be transmitted to at least one of the UE or another UE to assist in receiving transmit beams from the access point. In an aspect, beam configuring component 342, e.g., in conjunction with processor(s) 312, memory 316, transceiver 302, etc., can transmit, to the at least one of the UE (e.g., UE 104) or another UE, the one or more parameters to assist in receiving transmit beams from the access point (e.g., from base station 102). For example, beam configuring component 342 can configure the UE 104 with the one or more parameters using a downlink control channel signaling, radio resource control (RRC) or higher layer signaling, etc. The UE 104 can receive the one or more parameters and can accordingly determine beam groups and/or beam group orderings to use in beamforming subarrays for receiving signals from the access point based on the received parameters and/or based on other considerations, as described above.

In method 500, at Block 510, one or more signals beamformed based on the second indication can be transmitted to the UE based on receiving the reporting. In an aspect, beam configuring component 342, e.g., in conjunction with processor(s) 312, memory 316, transceiver 302, etc., can transmit, to the UE and based on receiving the reporting, one or more signals beamformed based on the second indication. For example, beam configuring component 342 can beamform the signal according to a determined desirable transmit beam (or beam groups or beam group orderings for determining the transmit beam over a period of time), which can be determined based on received reportings of signal metrics from UE 104 and/or one or more other UEs over a period of time.

Figure 7:
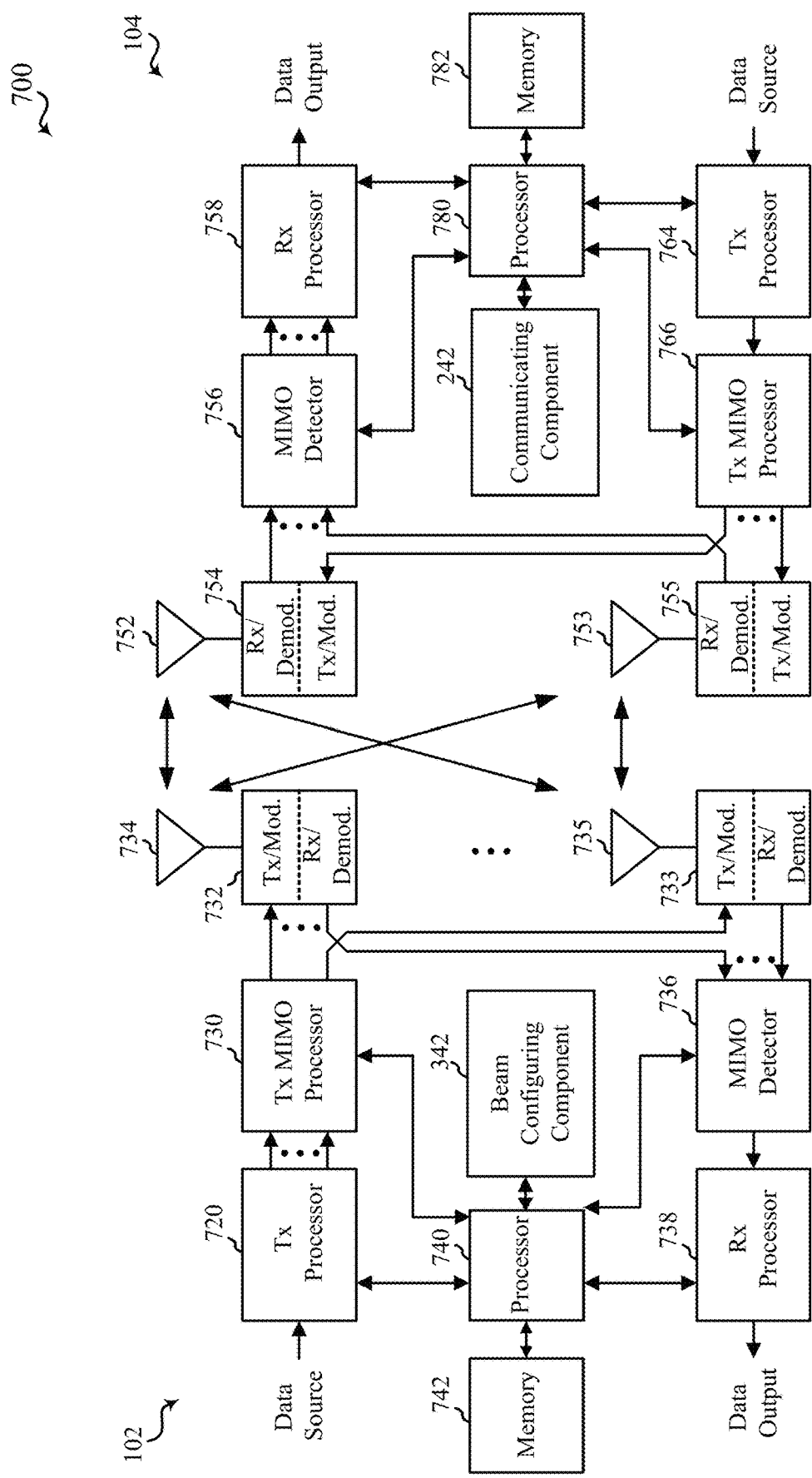
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a beam configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   determining, by a user equipment (UE) having multiple antenna subarrays each capable of beamforming using multiple beams, multiple beam groups, wherein each beam group of the multiple beam groups includes a subset of the multiple beams for beamforming by the UE;
   determining, by the UE, a beam group ordering of the multiple beam groups, wherein the beam group ordering is based on an antenna subarray configuration of the multiple antenna subarrays of the UE;
   receiving, from an access point and based on beamforming, by the UE, one or more of the multiple antenna subarrays using the beam group ordering, multiple transmit beams;
   determining at least one of the multiple transmit beams having a received signal metric exceed a signal metric threshold; and
   transmitting a first indication associated with the multiple beam groups along with a second indication identifying the at least one of the multiple transmit beams and identifying an associated signal metric of the at least one of the multiple transmit beams, wherein the first indication indicates at least the beam group ordering used by the UE in receiving the multiple transmit beams.

2. The method of claim 1, wherein transmitting the first indication along with the second indication comprises transmitting, over a period of time, multiple indications of different beam groups or beam group orderings along with multiple second identifiers of multiple ones of the multiple transmit beams.

3. The method of claim 1, wherein the associated signal metric includes at least one of a reference signal received power (RSRP), reference signal received quality (RSRQ), received signal strength indicator (RSSI), signal-to-interference-and-noise ratio (SINR), or signal-to-noise ratio (SNR), of the transmit beam.

4. The method of claim 1, wherein at least one of determining the multiple beam groups or determining the beam group ordering is based at least in part on determining to implement one of multiple performance objectives.

5. The method of claim 4, wherein the multiple performance objectives including one or more of minimizing radio frequency (RF) power consumption, maximizing beam refinement opportunities, or maximizing spatial coverage.

6. The method of claim 1, wherein the multiple beam groups correspond to beam weights used across multiple layers of the UE over one time period.

7. The method of claim 1, further comprising receiving, from the access point, one or more parameters indicating at least one of the multiple beam groups or the beam group ordering.

8. The method of claim 7, wherein at least one of determining the multiple beam groups or the beam group ordering is based at least in part on the one or more parameters.

9. The method of claim 7, wherein at least one of determining the multiple beam groups or the beam group ordering is further based at least in part on one or more other parameters determined by the UE.

10. The method of claim 9, wherein the one or more other parameters include at least one of a desired performance objective, a channel condition, or an antenna blocking condition.

11. An apparatus for wireless communication, comprising:
- a transceiver for communicating in a wireless network via multiple antenna subarrays each capable of beamforming using multiple beams;
- a memory configured to store instructions; and
- one or more processors communicatively coupled with the transceiver and the memory, wherein the one or more processors are configured to:
  - determine multiple beam groups, wherein each beam group of the multiple beam groups includes a subset of the multiple beams for beamforming by the apparatus;
  - determine a beam group ordering of the multiple beam groups, wherein the beam group ordering is based on an antenna subarray configuration of the multiple antenna subarrays of the UE;
  - receive, from an access point and based on beamforming, by the apparatus, one or more of the multiple antenna subarrays using the beam group ordering, multiple transmit beams;
  - determine at least one of the multiple transmit beams having a highest received signal metric exceeding a signal metric threshold; and
  - transmit a first indication associated with the multiple beam groups along with a second indication identifying the at least one of the multiple transmit beams and identifying an associated signal metric of the at least one of the multiple transmit beams, wherein the first indication indicates at least the beam group ordering used by the apparatus in receiving the multiple transmit beams.

12. The apparatus of claim 11, wherein the one or more processors are configured to transmit the first indication along with the second indication at least in part by transmitting, over a period of time, multiple indications of different beam groups or beam group orderings along with multiple second identifiers of multiple ones of the multiple transmit beams.

13. The apparatus of claim 11, wherein the associated signal metric includes at least one of a reference signal received power (RSRP), reference signal received quality (RSRQ), received signal strength indicator (RSSI), signal-to-interference-and-noise ratio (SINR), or signal-to-noise ratio (SNR), of the transmit beam.

14. The apparatus of claim 11, wherein the one or more processors are configured to at least one of determine the multiple beam groups or determine the beam group ordering based at least in part on determining to implement one of multiple performance objectives.

15. The apparatus of claim 14, wherein the multiple performance objectives including one or more of minimizing radio frequency (RF) power consumption, maximizing beam refinement opportunities, or maximizing spatial coverage.

16. The apparatus of claim 11, wherein the multiple beam groups correspond to beam weights used across multiple layers of the apparatus over one time period.

17. The apparatus of claim 11, wherein the one or more processors are configured to receive, from the access point, one or more parameters indicating at least one of the multiple beam groups or the beam group ordering.

18. The apparatus of claim 17, wherein the one or more processors are configured to at least one of determine the multiple beam groups or determine the beam group ordering based at least in part on the one or more parameters.

19. The apparatus of claim 17, wherein the one or more processors are configured to at least one of determine the multiple beam groups or determine the beam group ordering further based at least in part on one or more other parameters determined by the apparatus.

20. The apparatus of claim 19, wherein the one or more other parameters include at least one of a desired performance objective, a channel condition, or an antenna blocking condition.

21. An apparatus for communicating in a wireless network, comprising:
- means for determining, for multiple antenna subarrays each capable of beamforming using multiple beams, multiple beam groups, wherein each beam group of the multiple beam groups includes a subset of the multiple beams for beamforming by the apparatus;
- means for determining a beam group ordering of the multiple beam groups, wherein the beam group ordering is based on an antenna subarray configuration of the multiple antenna subarrays of the UE;
- means for receiving, from an access point and based on beamforming, by the apparatus, one or more of the multiple antenna subarrays using the beam group ordering, multiple transmit beams;
- means for determining at least one of the multiple transmit beams having a received signal metric exceeding a signal metric threshold; and
- means for transmitting a first indication associated with the multiple beam groups along with a second indication identifying the at least one of the multiple transmit beams and identifying an associated signal metric of the at least one of the multiple transmit beams, wherein the first indication indicates at least the beam group ordering used by the apparatus in receiving the multiple transmit beams.

22. The apparatus of claim 21, wherein the means for transmitting the first indication along with the second indication comprises means for transmitting, over a period of time, multiple indications of different beam groups or beam group orderings along with multiple second identifiers of multiple ones of the multiple transmit beams.

23. The apparatus of claim 21, wherein the associated signal metric includes at least one of a reference signal received power (RSRP), reference signal received quality (RSRQ), received signal strength indicator (RSSI), signal-to-interference-and-noise ratio (SINR), or signal-to-noise ratio (SNR), of the transmit beam.

24. The apparatus of claim 21, wherein at least one of the means for determining the multiple beam groups or the means for determining the beam group ordering determines based at least in part on determining to implement one of multiple performance objectives.

25. The apparatus of claim 24, wherein the multiple performance objectives including one or more of minimizing radio frequency (RF) power consumption, maximizing beam refinement opportunities, or maximizing spatial coverage.

26. A non-transitory computer-readable medium, comprising code executable by one or more processors for communicating by a user equipment (UE) in a wireless network, the code comprising:
   code for determining, for multiple antenna subarrays each capable of beamforming using multiple beams, multiple beam groups, wherein each beam group of the multiple beam groups includes a subset of the multiple beams for beamforming by the UE;
   code for determining a beam group ordering of the multiple beam groups, wherein the beam group ordering is based on an antenna subarray configuration of the multiple antenna subarrays of the UE;
   code for receiving, from an access point and based on beamforming, by the UE, one or more of the multiple antenna subarrays using the beam group ordering, multiple transmit beams;
   code for determining at least one of the multiple transmit beams having a received signal metric exceeding a signal metric threshold; and
   code for transmitting a first indication associated with the multiple beam groups along with a second indication identifying the at least one of the multiple transmit beams and identifying an associated signal metric of the at least one of the multiple transmit beams, wherein the first indication indicates at least the beam group ordering used by the UE in receiving the multiple transmit beams.

27. The non-transitory computer-readable medium of claim 26, wherein the code for transmitting the first indication along with the second indication comprises code for transmitting, over a period of time, multiple indications of different beam groups or beam group orderings along with multiple second identifiers of multiple ones of the multiple transmit beams.

28. The non-transitory computer-readable medium of claim 26, wherein the associated signal metric includes at least one of a reference signal received power (RSRP), reference signal received quality (RSRQ), received signal strength indicator (RSSI), signal-to-interference-and-noise ratio (SINR), or signal-to-noise ratio (SNR), of the transmit beam.

29. The non-transitory computer-readable medium of claim 26, wherein at least one of the code for determining the multiple beam groups or the code for determining the beam group ordering determines based at least in part on determining to implement one of multiple performance objectives.

30. The non-transitory computer-readable medium of claim 29, wherein the multiple performance objectives including one or more of minimizing radio frequency (RF) power consumption, maximizing beam refinement opportunities, or maximizing spatial coverage.

31. A method for wireless communication, comprising:
   transmitting, by an access point, multiple transmit beams using multiple beamforming configurations of multiple antennas;
   receiving, by the access point, a reporting including a first indication associated with multiple beam groups along with a second indication identifying at least one of the multiple transmit beams and identifying associated signal metrics of the at least one of the multiple transmit beams, wherein the first indication indicates at least a beam group ordering of the multiple beam groups used by a user equipment (UE) in receiving the multiple transmit beams, wherein the beam group ordering is determined by the UE based on an antenna subarray configuration of multiple antenna subarrays of the UE;
   determining, based on the reporting, one or more parameters indicating one or more desired beam groups or beam group orderings; and
   transmitting the one or more parameters to assist in receiving transmit beams from the access point.

32. The method of claim 31, wherein receiving the reporting comprises receiving multiple reportings from the UE over multiple periods of time, and wherein determining the one or more parameters is based at least in part on the multiple reportings.

33. The method of claim 31, further comprising transmitting, to the UE and based on receiving the reporting, one or more signals beamformed based on the second indication.

34. The method of claim 33, wherein determining the one or more parameters is further based at least in part on a beam selected for beamforming the one or more signals.

35. The method of claim 31, wherein determining the one or more parameters is further based at least in part on identifying a type of the UE.

36. An apparatus for wireless communication, comprising:
   a transceiver for communicating in a wireless network via multiple antennas in one or more subarrays;
   a memory configured to store instructions; and
   one or more processors communicatively coupled with the transceiver and the memory, wherein the one or more processors are configured to:
      transmit multiple transmit beams using multiple beamforming configurations of multiple antennas;
      receive a reporting including a first indication associated with multiple beam groups along with a second indication identifying at least one of the multiple transmit beams and identifying associated signal metrics of the at least one of the multiple transmit beams, wherein the first indication indicates at least a beam group ordering of the multiple beam groups used by a user equipment (UE) in receiving the multiple transmit beams, wherein the beam group ordering is determined by the UE based on an antenna subarray configuration of multiple antenna subarrays of the UE;
      determine, based on the reporting, one or more parameters indicating one or more desired beam groups or beam group orderings; and
      transmit the one or more parameters to assist in receiving transmit beams.

37. The apparatus of claim 36, wherein the one or more processors are configured to receive multiple reportings from the UE over multiple periods of time, and where the one or more processors are configured to determine the one or more parameters based at least in part on the multiple reportings.

38. The apparatus of claim 36, wherein the one or more processors are further configured to transmit, to the UE and based on receiving the reporting, one or more signals beamformed based on the second indication.

39. The apparatus of claim 38, wherein the one or more processors are configured to determine the one or more parameters further based at least in part on a beam selected for beamforming the one or more signals.

40. The apparatus of claim 36, wherein the one or more processors are configured to determine the one or more parameters further based at least in part on identifying a type of the UE.

41. An apparatus for communicating in a wireless network, comprising:
- means for transmitting multiple transmit beams using multiple beamforming configurations of multiple antennas;
- means for receiving a reporting including a first indication associated with multiple beam groups along with a second indication identifying at least one of the multiple transmit beams and identifying associated signal metrics of the at least one of the multiple transmit beams, wherein the first indication indicates at least a beam group ordering of the multiple beam groups used by a user equipment (UE) in receiving the multiple transmit beams, wherein the beam group ordering is determined by the UE based on an antenna subarray configuration of multiple antenna subarrays of the UE;
- means for determining, based on the reporting, one or more parameters indicating one or more desired beam groups or beam group orderings; and
- means for transmitting the one or more parameters to assist in receiving transmit beams.

42. The apparatus of claim 41, wherein the means for receiving the reporting receives multiple reportings from the UE over multiple periods of time, and wherein the means for determining determines the one or more parameters based at least in part on the multiple reportings.

43. A non-transitory computer-readable medium, comprising code executable by one or more processors for communicating in a wireless network, the code comprising:
- code for transmitting multiple transmit beams using multiple beamforming configurations of multiple antennas;
- code for receiving a reporting including a first indication associated with multiple beam groups along with a second indication identifying at least one of the multiple transmit beams and identifying associated signal metrics of the at least one of the multiple transmit beams, wherein the first indication indicates at least a beam group ordering of the multiple beam groups used by a user equipment (UE) in receiving the multiple transmit beams, wherein the beam group ordering is determined by the UE based on an antenna subarray configuration of multiple antenna subarrays of the UE;
- code for determining, based on the reporting, one or more parameters indicating one or more desired beam groups or beam group orderings; and
- code for transmitting the one or more parameters to assist in receiving transmit beams.

44. The non-transitory computer-readable medium of claim 43, wherein the code for receiving the reporting receives multiple reportings from the UE over multiple periods of time, and wherein the code for determining determines the one or more parameters based at least in part on the multiple reportings.

* * * * *